United States Patent [19]
Bonham

[11] 3,793,761
[45] Feb. 26, 1974

[54] REMOTELY STEERED TROLLER

[76] Inventor: Ralph D. Bonham, 381 W. Center, Pleasant Grove, Utah 84062

[22] Filed: May 28, 1971

[21] Appl. No.: 147,755

[52] U.S. Cl.................................. 43/26.1, 46/93
[51] Int. Cl............................................ A01k 85/06
[58] Field of Search............ 43/26.1; 46/93, 94, 244

[56] References Cited
UNITED STATES PATENTS

| | | | |
|---|---|---|---|
| 1,850,296 | 3/1932 | Vermeulen | 43/26.1 |
| 2,693,047 | 11/1954 | Lumsden | 43/26.1 |
| 2,834,152 | 5/1958 | Lambert | 46/93 |
| 3,106,796 | 10/1963 | Friedland | 43/26.1 |

Primary Examiner—Warner H. Camp
Attorney, Agent, or Firm—B. Deon Criddle

[57] ABSTRACT

A powered watercraft having a fishing pole mounted thereon. The craft is launched and is remotely controlled by a stationary operator and is powered by rechargeable electric batteries which drive an electric motor to turn a propeller. A retractable line extends from the operator to a directional control mast on the craft such that a tug or jerk on the line connected to the mast, from any direction, operates a mechanical linkage, thereby changing the relative position of a directional rudder beneath the rear portion of the craft.

Each time the mast is pivoted, the position of the rudder is changed through one step in a series of indexed angular attitudes. Thus, the direction of travel of the craft is remotely controlled by the operator, pivoting the mast to the extent necessary to achieve a desired direction.

7 Claims, 8 Drawing Figures

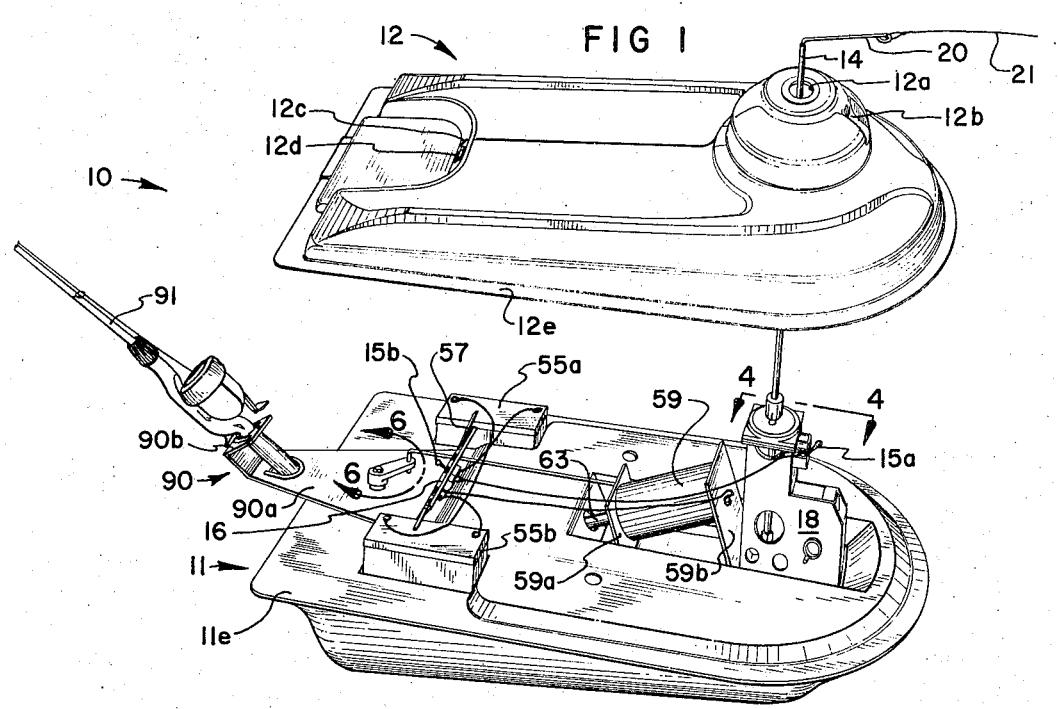
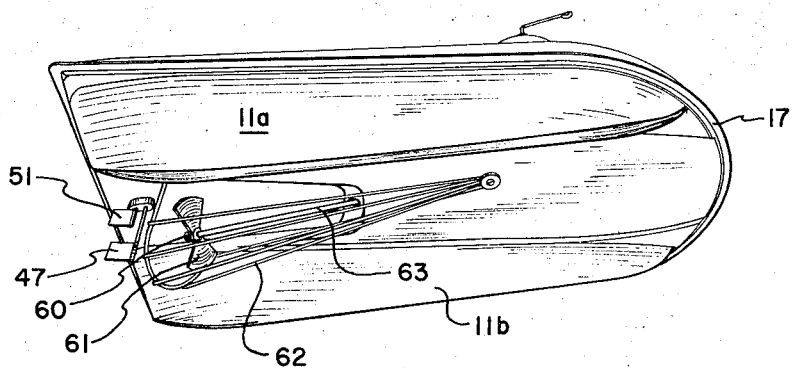
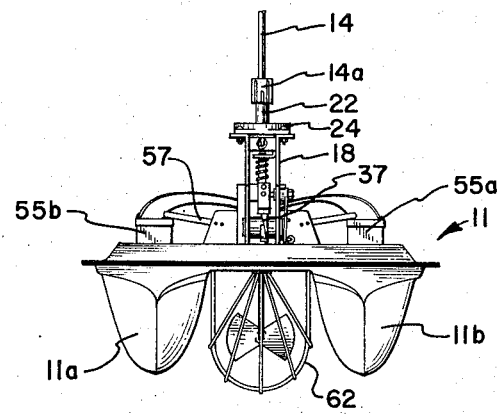

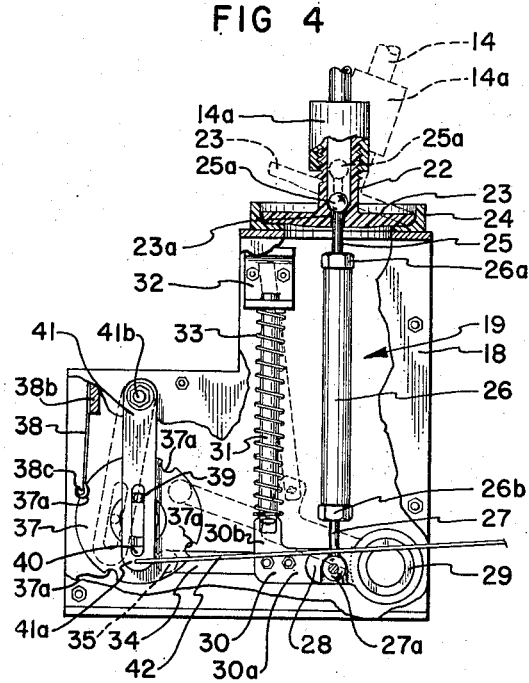

REMOTELY STEERED TROLLER

BRIEF DESCRIPTION OF THE INVENTION

1. Field of the invention

This invention relates to remotely controlled apparatus for off-shore troll fishing.

2. Prior Art

In fishing it is highly desirable to position bait or a lure where fish are located and to make the bait or lure move in such a manner that it effectively attracts a fish. For the shore fisherman, this generally involves casting of the bait or lure beyond the shallows proximate to shore to deeper water. If an artificial lure is used, the lure is cast out without too much difficulty and then is reeled back through the shallows into shore. If a soft bait is used, great skill and care is required to cast the bait so that it will land intact. In either case, the lure may tangle or a hook may catch as the line is reeled in.

Numerous devices have been proposed in the past to enable a shore fisherman to place his lure or bait or to give a trolling action. Devices such as those shown by U.S. Pat. Nos. 2,804,712, 3,045,381, 2,803,914, 1,401,096 and others, each employ a driving means which is usually an electric motor, to move a lure or bait connected to a fishing line and having a hook thereon, through water to attract fish. No means are provided on these prior art devices to control their direction of travel so the fisherman using them simply points them in the desired direction of travel and turns them loose.

A rudder is provided on the device shown in U.S. Pat. No. 2,726,471 and U.S. Pat. No. 3,099,099 shows a device having a rudder which is frictionally locked in position by the operator prior to launch to better steer the craft after launch. U.S. Pat. No. 3,203,131 shows a motor operated watercraft with a rudder that is connected by a line to the shore. This arrangement is intended to allow an operator to control movement of the craft by manipulation of the line to the right or left as the craft moves away from the operator. It does not allow the craft to be directed in a path back towards the operator.

U.S. Pat. Nos. 1,805,296, 2,693,047 and 3,106,796 each show a motor driven fishing craft with means for remotely controlling the direction of travel from shore. The controlling means used with each of these devices consists of a plurality of lines extending from the shore to the craft and connecting directly to a rudder arrangement. A pull on one line positions the rudder in one position while a pull on the other line changes the rudder position.

To my knowledge there has not heretofore been known a control arrangement whereby an operator on shore can selectively move the rudder of a craft to one of a number of indexed positions, thereby positively steering the craft merely with a tug or pull on a single line.

Neither, so far as I am aware has there heretofore been known a remotely controlled fishing craft that is stable for control purposes, economical to build and having a hull design that allows it to travel, even in shallow water and onto a shoreline.

SUMMARY OF THE INVENTION

The present invention comprises a watercraft having a hull design and propeller protection means thereon whereby it lends itself to stable deep or shallow water operations. The hull design prevents tipping of the watercraft when a pull is applied through a control mast extending upwardly therefrom and a remote operator can, therefore, pull on a control line connected to a directional control means. The control line is connected through an indexing assembly to a rudder projecting from beneath the craft and each time the line is sufficiently jerked the rudder position is changed, thereby changing the direction of travel of the craft.

Principal objects of the present invention are to provide a steerable watercraft that has means thereon for trolling a fishing line behind and for returning any fish caught on the line to the operator.

Other objects are to provide a single line operated directional control means whereby a significant pull on the line will actuate a means to position and maintain a rudder in one of a number of indexed, cyclic positions and wherein repeated significant pulls will sequentially step the rudder through the entire cycle of indexed positions.

Other objects are to provide a remotely controlled watercraft having a wide bottom incorporating a hull having protected propeller means, and designed to accommodate both deep and shallow water conditions and to be easily moved onto a gradually decreasing shoreline.

Principal features of the present invention include a remotely controlled watercraft carrying a releasably mounted fishing pole that extends from the stern of the craft. The watercraft has a bow to stern tapered catamaran type hull portions and is designed with a shielded propeller and drive shaft extending between the two portions of the hull. The catamaran hull construction provides sufficient stability to keep the watercraft from tipping over when a tugging or jerking force is applied to or through a control mast projecting from the top of the craft.

The control mast projecting from the top surface of the watercraft may have one end of a control line connected to it, with the other end of the line being connected to a reel held by an operator. A sharp pull or jerk by the operator of the control line will tilt the mast, which is mounted to be universally tilted in any direction, to operate a rudder control means, thereby swinging the rudder to one of a number of pre-set indexed positions. Once positioned in an index position the rudder is maintained in that position until such time as the control mast is again tilted. Alternatively, the line may be connected through a mast, directly to an indexing mechanism through which a rudder position is set.

The watercraft is driven by a propeller that is turned by an electric motor. Power is supplied to the motor from rechargeable storage batteries which provide an extended period of operation between rechargings.

Switch means are provided at both the bow and the stern of the watercraft, either of which will start or stop the motor. Thus, the craft can be pointed in a general desired direction of travel and the motor can be turned on with the stern switch. Then, after trolling and either with or without a fish on the trolling pole, the craft can be brought back to the operator who can turn the motor off with the bow switch as the craft approaches him.

The watercraft housing is preferably constructed of a lightweight plastic which is molded to provide an attractive, functional and watertight hull. The catamaran portions of the hull are tapered from greater to lesser height dimensions from bow to stern of the craft so it can more easily travel in shallow water areas and can be directed onto a sloping bank without causing damage to the craft. The propeller and propeller shaft are protected by a cage shield and by the twin catamaran portions of the hull.

Additional objects and features of the invention will become apparent from the following detailed description and drawings, disclosing what is presently contemplated as being best modes of the invention.

THE DRAWINGS

FIG. 1 is an exploded perspective view of the watercraft of the present invention as seen from the top and side, showing the control mast extending through the top covering and with a trolling pole, shown fragmentarily, releasably mounted on the stern of the craft;

FIG. 2, a perspective view of the bottom of the craft as seen from one side;

FIG. 3, a front elevation view of the craft shown with the top covering removed;

FIG. 4, vertical section taken along the line 4—4 of FIG. 1 with the wall of the control mast housing partially cut away for clarity, and with alternate positions of the components shown in broken lines;

FIG. 5, a somewhat schematic, perspective view of the rudder control means of the embodiment of FIGS. 1–4;

FIG. 6, a fragmentary vertical section taken along the line 6—6 of FIG. 1, showing the rudder assembly;

FIG. 7, a top plan view of another embodiment of a rudder control means; and

FIG. 8, a vertical section view taken on the line 8—8 of FIG. 7.

DETAILED DESCRIPTION

Referring now to the drawings:

In the embodiment of FIGS. 1–6 the remotely steered troller, shown generally as a watercraft 10, includes a bottom hull portion 11, having twin catamaran hull portions 11a and 11b, and a top hull portion 12, which is clamped to the bottom hull portion 11. The catamaran hull portions have a lesser height at the bow of the craft 10 and expand to a greater height at the stern of the craft. This design holds the bow of the craft high and allows for operation in both deep and shallow waters and allows the craft to be easily powered close to a shore or onto a sloping bank area, without damaging the bottom hull portion 11. Top hull portion 12 has holes 12a, 12b, 12c and 12d formed therein to accommodate an upwardly extending mast 14, electrical switches 15a and 15b and an outlet 16 for connection to a battery charger. As best seen in FIG. 2, a resilient, channeled sealing strip 17 is fitted over mating flanges 11e and 12e of the bottom and top hull portions 11 and 12, respectively, to provide an essentially waterproof seal between the hull portions.

The mast 14 extends from a mast housing, 18, within which is mounted the rudder control means, shown generally at 19, FIGS. 4 and 5, to be hereinafter described in greater detail. An arm 20 extends from the top of mast 14 and is mounted to swivel with respect to the top of the mast. A strong line 21, shown fragmentarily, has one end connected to the free end of arm 20 and the other end connected to a reel on a fishing pole (not shown) that is held by an operator. The operator changes the direction of travel of the watercraft, as will be explained, by pulling on and tilting mast 14, through the line and the swiveling arm 20. A coupling 14a joins the mast to a threaded base post 22 that extends upwardly from a base 23. The base 23 is circular and rests on a circular saddle mount 24. Saddle mount 24 is fixed to the top of the mast housing 18.

A rod 25 has a ball 25a on its uppermost end that fits within a socket 23a of base 23. The universal coupling between ball 25a and the socket 23a allows free lateral movement of the rod 25 with respect to base 23 and the post 22. The end of rod 25, opposite to ball 25a is secured to the end of a driver rod 26 by a coupling 26a. Another coupling 26b secures one end of a link 27 to the lower end of driver rod 26. The link 27 has a ball 27a on its other end and the ball 27a is journaled into and fits within a socket 28a of an arm 28.

Arm 28 is pivotally connected by an axle 29 to the side walls of mast housing 18 and a bracket 30 is rigidly secured to the end of arm 28 opposite axle 29. Bracket 30 has two legs 30a and 30b extending at right angles with respect to each other. Leg 30a is connected to arm 28 and leg 30b is secured to a spring guide rod 31. The lower end of rod 31 is connected by a pin 31a to bracket leg 30b, and the other end of the rod is journaled to slide through a bracket 32 that extends from a side wall of mast housing 18. A spring 33 surrounds rod 31 and in its expanded condition extends between pin 31a and bracket 32.

When mast 14 is pivoted, for example to the position shown in phantom in FIG. 4, rods 25 and 26 and link 27 are raised, thereby swinging arm 28 clockwise around axle 29. This elevates spring guide rod 31, and compresses spring 33. When the tilting force on mast 14 is released, the spring 33 acts to return the mast to a vertical attitude.

A spring-type roller mounting arm 34 has one end rigidly attached to bracket 30 such that it extends perpendicular to leg 30b. A roller 35 has one end of an axle 35a (FIG. 5) journaled therethrough, the other end of the axle extending through and being secured to the free end of the roller mounting arm 34.

As mast 14 is tilted to raise rods 25 and 26 and link 27 and to pivot arm 28 upwardly, arm 34 and the roller 35 are also raised. As the roller is raised it engages an abrupt surface 36a of one of a number (here shown as four) of cam surfaces 36 spaced around one side of a wheel 37. Continued movement of the roller upwardly turns the wheel until the abrupt surface is rotated away from the roller. The wheel has thus been turned one index step. The wheel is yieldably held in this position by a leaf spring 38 that is fixed at 38a to a bracket 38b secured to the mast housing and that has a curved portion 38c that rides on the periphery of the wheel and that moves into notches 37a spaced around the wheel periphery. As the wheel is moved to an indexed position by the upwardly moving roller 35 the spring 38 moves into a notch 37a to hold the wheel against reverse rotation as the roller moves back to its starting position. When the tilting pressure on the mast is released, spring 33 moves the arm 34 and roller 35 down at the same time it moves the mast back to its upright attitude. Since arm 34 is of spring-type it yields in a direction transverse to the up and down movement of the arm to allow the roller to move down across the next cam surface 36 in the indexing cycle, to a position where it snaps beneath the abrupt surface of that cam surface.

Wheel 37 rotates around an axle 37b that extends between walls of the mast housing 18 and has a pin 39 that protrudes perpendicularly from the side of the wheel opposite the cam surface 36 and that is eccentrically positioned with respect to the axis of the wheel. Pin 39 extends into a slot 40 that is formed in a shift arm 41. As wheel 37 turns and pin 39 rotates about axle 37b the orbiting motion of the pin is translated into a swinging movement of the free end 41a of shift arm 41. The other end of arm 41 is journaled about an axle 41b that extends between and that is connected to opposite side walls of the mast housing 18. A rudder control rod 42 is pivotally connected to the free end 41a of the shift arm and the control rod extends rearwardly to the stern of the craft.

A rudder control arm 43, FIG. 6, is pivotally connected at 44 to the end of control rod 42, at the stern of the craft. The rudder control arm 43 is frictionally secured to the top of a rudder shaft 45 that extends upwardly between the catamaran portions of the hull, through a bearing block 46 and into the craft housing. A rudder blade 47 is fixed to and extends from the lower end of shaft 45 and a nut 48 threaded onto the top of the shaft holds the arm on the shaft. Thus, as arm 41 is moved back or forth, in response to movement of the indexing wheel 37, the control rod 42 turns the control arm 43 a corresponding amount about the axis formed by shaft 45.

A bolt and nut unit 49 extends through the flanges 11e of the hull to secure one side of the block 46 beneath the hull and a shaft 50 having another rudder blade 51 thereon extends through the block and the body members to have a nut 51a threaded thereon. The nut clamps the flanges 11e and block 46 between the blade 51, which can be set in any desired position, but which adds stability to travel of the craft, and the nut, thereby holding the blade in a set position.

Power for the watercraft operation is supplied by rechargeable storage batteries 55a and 55b, FIG. 1, that are fitted into appropriate recesses in the deck of the bottom hull section. Electrical wiring connects the batteries through either the switch 15b mounted near the stern of the craft on a plate 57 or the switch 15a near the bow, for example, on the mast housing 18, to an electric motor 59. Electric motor 59 is rigidly maintained at an angle with respect to the deck of the bottom portion 11, by brackets 59a and 59b. This angular arrangement allows a propeller shaft 60, FIG. 2, which is directly connected to the output shaft of the motor, to extend straight through the upper and lower decks of bottom portion 11 to a propeller 61 positioned between the catamaran hull portions. A propeller protection cage 62, fixed to the hull, surrounds the propeller and shaft to protect the propeller. A casing 63 surrounds the propeller shaft and extends from the motor to the propeller to keep the water from damaging the drive unit.

The plug-in outlet 16, electrically connected to the batteries 55a and 55b, is also mounted on plate 57 to receive a plug from a battery charger, not shown.

Another embodiment of rudder control means 70 is shown in FIGS. 6 and 7. As shown, the control means is mounted to the deck shown fragmentarily at 71. The control means 70 is mounted on a central axle 72, which extends through slot 73a in one leg of an arm 73, an indexing wheel 74, a shift arm 75 and that is threaded into the deck 71 of the craft. A spring 76 has one end (not shown) fixed to deck 71 and its opposite end connected to shift arm 75 at 75a. Dogs 77a and 77b are pivotally mounted on the shift arm at 78a and 78b, respectively, and springs 79a and 79b each having one end secured to shift arm 75, are positioned to bias the dogs 77a and 77b such that teeth 77c and 78c respectively formed thereon are constantly held against the periphery of wheel 74. Wheel 74 has a series of abrupt cam notches 80 spaced in diagonally opposite relationship therearound, and, as will be explained, the dogs 77a and 77b engage the abrupt surfaces to turn the wheel.

Wheel 74 has additional spaced depressions 81 in the bottom face thereof and a pin 82 which extends perpendicularly up from the upper face of the wheel. Pin 82 extends into the slot 73a.

A detent 83, seen best in FIG. 7, extends through the deck 71 and is biased by a spring 84, positioned between the deck 71 and a collar 85 on the detent, into constant engagement with the wheel 74.

In operation, a remotely positioned operator will control the watercraft by sharply pulling on a line 86 which is connected down through a mast, not shown to one end of the shift arm 75. Each pull rotates the shift arm 75 around axle 72 until the arm engages a stop 87 fixed to the deck 71. As the arm 75 rotates the dogs 77a and 77b engage oppositely positioned cam notches and rotate the wheel 74. When the pull on the line 86 is released the spring 76, biases the arm back to the starting position shown in FIG. 6, where the dogs will engage other oppositely positioned abrupt cam surfaces.

When the arm 75 contacts stop 87, detent 83 moves into a depression 81 to hold the wheel against reverse rotation as arm 75 moves back to its starting position. During the return movement, the springs 79a and 79b allow the dogs to pivot as they follow the curve of the periphery of wheel 74.

Arm 73 has one leg containing the slot 73a and another leg extending normal thereto, to which the rudder control rod 42 heretofore described is pivotally connected. As the wheel 74 turns, the relative position of axle 72 and pin 82 change. Assuming the position shown in FIG. 6 to be a starting position, and with pin 82 at 9 o'clock relative to axle 72, the rudder control arm is positioned to hold the rudder in a straight travel position. Rotation of wheel 74 one-quarter turn will move pin 82 to a 6 o'clock position and the rudder control arm will be pivoted to move the rudder to a first angled position tending to turn the craft in one direction. Rotation of the wheel another quarter turn will move pin 82 to a 3 o'clock position where the rudder control arm is again in the position shown in FIG. 7 and the rudder is positioned in the straight travel position. Further cyclic rotation of wheel 74 will move the pin 82 to a twelve o'clock position, at which time the rudder control arm will be positioned such that the rudder will be in another angled position, tending to turn the craft in an opposite direction. The same cycle of rudder positions is therefore obtained with both of the rudder control means herein disclosed.

While specific indexing structures have been herein described and while the craft rudders, as described, are indexed sequentially through a straight drive, an angled drive, a straight drive and another angled position, it should be apparent that more indexing positions could as well be incorporated and that other indexing systems could be used.

In either embodiment of the invention, a bracket 90, having an attachment plate 90a and a pole support plate 90b is secured to the stern of the craft by bolts or the like, not shown.

The pole support plate is fixed to the attachment plate and extends upwardly therefrom. Aligned holes, large enough to receive the butt end of a fishing pole are provided in each plate and the butt of a short fishing pole 91, FIG. 2, is placed and held therein. Fishing line is let out from the secured pole before trolling is started with the craft or if desired, a conventional release mechanism, not shown, can be provided to release the line after the craft is underway.

The craft is started, by operation of switch 15a or switch 15b and is sent in a desired direction of travel. Thereafter, the operator, by using a fishing pole with a suitably heavy line attached to the indexing mechanism can steer the craft in any direction, including back towards him. Sharp pulls on the control will change the rudder position as has heretofore been described.

Although a preferred form of my invention has been herein disclosed, it it to be understood that the present disclosure is by way of example and that variations are possible without departing from the subject matter coming within the scope of the following claims, which subject matter I regard as my invention.

I claim:

1. A remotely steered troller comprising
   a flotation hull;
   drive means for moving said hull in water;
   means, including a rudder, for controlling the direction of travel of the hull in water;
   a single flexible control line; and
   means responsive to repeated sharp pulls on the single control line to operate the means for controlling the direction of travel of the hull in water to cyclically change said direction of travel, said means including
      indexing means for moving the rudder in sequence from a position steering the hull in a straight direction to a position steering the hull in a first turned direction, to a position again steering the hull in a straight direction, to a position steering the hull in an opposite turned direction and to the position wherein the hull is steered in a straight line direction, said positions consituting a complete cycle of changes of directions of travel,
      a universally tiltable mast,
      means coupling the mast to the indexing means, and
      means to bias said mast to an upright attitude.

2. A remotely steered troller as in claim 1, wherein the indexing means comprises
   a cam wheel rotatable in one direction;
   means to prevent inadvertant reverse rotation of said cam wheel;
   means coupling said mast to said cam wheel whereby tilting of said mast will rotate said wheel a predetermined amount; and
   means coupling said wheel to the rudder whereby the angular position of the rudder relative to the hull is varied in accordance with the rotational position of said wheel.

3. A remotely steered troller comprising
   a flotation hull having a catamaran type bottom;
   drive means for moving said hull in water, said drive means comprising an electric motor battery means supplying power to said motor and a propeller driven by said motor, said propeller being positioned at the stern of the craft between catamaran portions;
   means for controlling the direction of travel of the hull in water;
   a flexible control line; and
   means responsive to repeated sharp pulls on the control line to operate the means for controlling the direction of travel of the hull in water to cyclically change said direction of travel.

4. A remotely steered troller craft as in claim 3, wherein
   the catamaran portions of the hull project only slightly from the rest of the hull at the bow of the craft but extend continuously further therefrom in the direction of the stern of the craft.

5. A remotely steered troller craft as in claim 4, further including
   a cage beneath the catamaran portions of the hull and surrounding the propeller.

6. A remotely steered troller craft as in claim 4, wherein
   switch means are provided to start and stop the motor at the bow and at the stern of the craft.

7. A remotely steered troller comprising
   a flotation hull;
   drive means for moving said hull in water;
   means, including a rudder, for controlling the direction of travel of the hull in water;
   a single flexible control line; and
   means responsive to repeated sharp pulls on the single control line to operate the means for controlling the direction of travel of the hull in water to cyclically change said direction of travel, said means including
      indexing means for moving the rudder in sequence from a position steering the hull in a straight direction to a position steering the hull in a first turned direction, to a position again steering the hull in a straight direction, to a position steering the hull in an opposite turned direction and to the position wherein the hulll is steered in a straight line direction, said positions constituting a complete cycle of changes of directions of travel,
      an arm pivotable about a central axis,
      means connecting the line through an upright mast housing extending upwardly from the hull to one end of the arm,
      a cam wheel mounted for rotation about the central axis and having abrupt cam surfaces spaced around the periphery thereof,
      means on the arm for engaging the abrupt cam surfaces to rotate said wheel in one direction when the line is pulled,
      means to prevent inadvertant rotation of the cam wheel in the opposite direction,
      means to limit rotation of the wheel when said line is pulled, and
      means coupling said wheel and the rudder whereby the angular position of said rudder relative to the hull is varied in accordance with the rotational position of said wheel.

* * * * *